Dec. 29, 1925.

F. D. CHASE 1,567,711

ADJUSTABLE FAUCET

Filed Nov. 28, 1924

INVENTOR.
FRANKLIN D. CHASE
BY
Harry C. Schroeder
ATTORNEYS.

Patented Dec. 29, 1925.

1,567,711

UNITED STATES PATENT OFFICE.

FRANKLIN D. CHASE, OF BERKELEY, CALIFORNIA.

ADJUSTABLE FAUCET.

Application filed November 28, 1924. Serial No. 752,570.

*To all whom it may concern:*

Be it known that FRANKLIN D. CHASE, a citizen of the United States, residing at Berkeley, in the county of Alameda and State of California, has invented certain new and useful Improvements in Adjustable Faucets, of which the following is a specification.

My invention relates to an adjustable faucet of the compression type in which a spring forces the valve against the seat, and relates to a particular arrangement to take up wear in the valve so that the valve will always be properly seated, and will be opened by the prescribed movement, usual to such faucets.

In particular my invention pertains to the stem of the lever operated faucet in which a valve cup and a valve is threaded on the stem, the valve being normally pressed against the valve seat.

More specifically my invention is embodied in the combination of a valve stem, lever operated, having screw threads thereon passing through the valve cup in the faucet, and through a valve or washer held in the cup. The stem is provided with a notch at the upper end for engagement of a screw driver. By this means the stem may be screwed a further distance in the valve cup and valve washer to take up wear in the washer.

My invention will be more clearly understood from the accompanying specification and drawings in which.

Figures 1, 2:
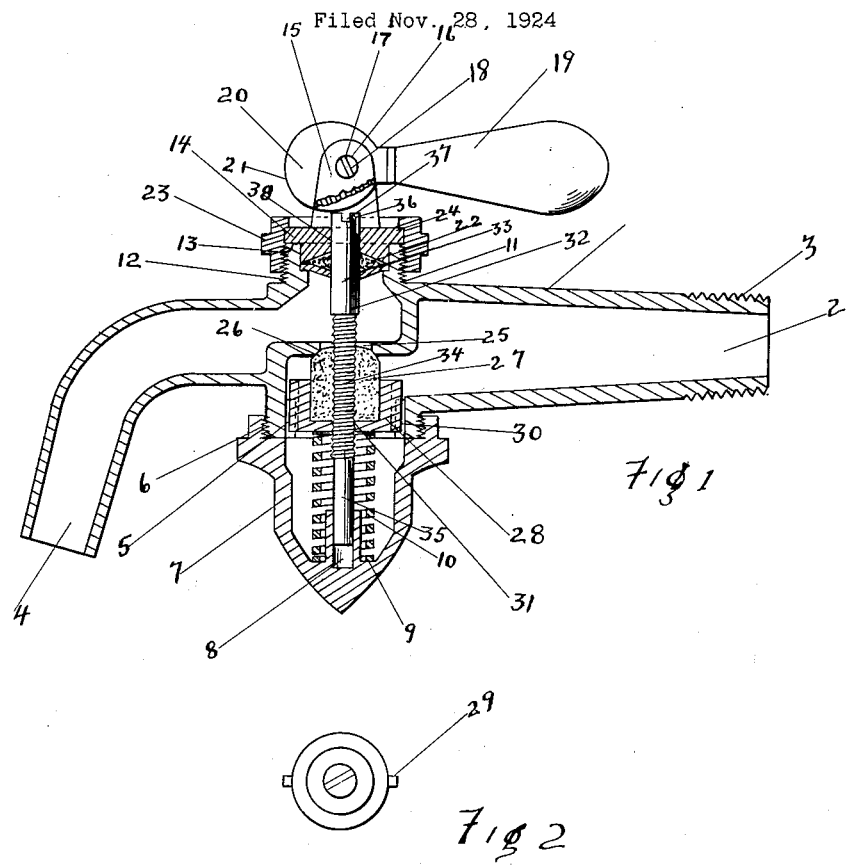
Figure 1 is a longitudinal section of a faucet illustrating the valve mechanism in section.
Figure 2 is a detail of the valve cup in plan view.

The faucet as a whole is indicated in Figure 1 in which the inlet 2 is provided with the usual screw threads 3 to be secured in any suitable source of water supply. The outlet 4 is preferably curved downwardly in the usual manner. The lower part of the faucet body has a rim 5 preferably screw threaded at 6 on which is mounted a cap 7 screw threaded on threads 6. This cap has an internal socket 8 and a seat 9 for a spring 10. Opposite the cap on the top of the valve is an upwardly extending rim 11 preferably screw threaded as indicated at 12. The upper surface of the rim is preferably squared at 13 and forms a seat for a plug 14. This plug has lugs 15 on its opposite side with an aperture 16 therethrough, through which extends a pin 17. This pin is preferably screw threaded into one of the lugs and has a screw driver head as indicated at 18. The handle 19 is pivotally mounted on the pin 17 and has an enlarged head 20 with a cam surface 21 for a purpose which will be hereinafter described. Underneath the plug is the usual packing 22 to prevent leakage of the faucet. The plug 14 is retained in position by a nut 23 having screw threaded engagement with the screws 12, and has a notch 24 engaging the upper face of the plug. The faucet is provided with the usual aperture 25 with a valve seat 26.

A valve 27, preferably made of the usual composition, such as vulcanized rubber, leather, or copper, is supported in the valve cup 28. It has lugs 29 on the outside of the periphery sliding in the slots 30 on the interior of the rim 5. The valve cup has a screw threaded aperture 31 through which passes the stem 32. This stem has preferably a smooth, cylindrical surface 33 at its upper end, a screw threaded portion 34 of slightly smaller diameter and a lower cylindrical portion 35 engaging in the socket 8.

At the upper end of the stem I provide a notch 36 formed in the head 37, adapted to be engaged by a screw driver. The stem has a reciprocating movement through an aperture 38 in the plug 22. The manner of operation of the valve is as follows: Normally the spring 10 presses the valve cup 28 and its contained valve 27 upwardly against the valve seat 26. To open the faucet, the handle 19 is swung upwardly causing the cam 21 to bear against the head 37 of the stem 32. This depresses the valve and opens the aperture 25, allowing fluid to flow freely through the faucet.

The manner of adjusting the valve to take up wear or for other reasons is as follows: the screw 16 by means of a screw driver or other tool may be loosened from the lug 15 into which it is screw threaded and removed sufficiently to allow the handle 19 and the enlarged head 20 to be removed. A screw driver may then be inserted in the notch 36 and the stem 32 thereby threaded into the valve cup 28.

It has been found in valves of this type that the spring is usually insufficient to properly take up the wear in the material of the valves in their engagement with the seat of a faucet of the prior character. By the above mentioned construction a positive adjustment may be made. It is not necessary that the valve member 27 be threaded unless it is made of hard material. In the sliding movement of the valve cup and valve in the rim 5 and the upper part of the cover of the cap 7 is kept from rotation by the lugs 29 engaging in the slots 30. After the adjustment of the valve is made, or a new valve member 27 inserted, the handle 19 is inserted in place between the lugs 15 and the screw 16 replaced.

The spring 10 is made sufficiently stiff so that it will always press the valve cup 28 and contained valve 27 upwardly against the valve seat 26, provided there is sufficient distance between the cam surface 21 and the stem 32. However, as above pointed out, when the valve 27 becomes worn, the stem is supposed to be screwed downwardly so that the valve will properly seat.

To assemble or disassemble the valve, the cap 7 is unscrewed from the rim 5. This allows the valve cup, valve and stem to be completely removed from the faucet through the lower part of the faucet. The replacement is by the reverse operation in which the upper portion of the stem 32 is inserted through the aperture 38 in the plug 14 and the lower end of the stem 35 engaging the socket 8 of the cap 7.

A faucet having the features of my invention may be used for various fluids other than water, and would probably require certain modifications within the scope of my invention to adapt it for thick fluids, such as heavy oils.

Having described my invention, I claim:

1. A faucet comprising in combination inlet and outlet passages, and a valve seat there-between, a plug secured to the top of the valve, a stem slidably mounted through the plug and extending through the valve seat, a valve adjustably mounted on the stem, a cap having a screw threaded engagement with the lower part of the faucet and opposite the plug, and means to reciprocate the stem, a spring in the cap normally tensioned to press the valve against the seat and means on the stem outside of the plug to adjust the valve on the said stem.

2. A faucet comprising in combination inlet and outlet passages, and a valve seat there-between, a plug secured to the top of the valve, a stem slidably mounted through the plug and extending through the valve seat, a valve adjustably mounted on the stem, a cap having a screw threaded engagement with the lower part of the faucet and opposite the plug, a socket in the cap forming a guideway for the stem, a lever operated cam to bear against the upper end of the stem, a spring in the cap normally tensioned to press the valve against the seat and means on the stem outside of the plug to adjust the valve on the said stem.

3. In a faucet, a stem having an upper cylindrical part, a notch in the head of the stem, a screw threaded portion, an upwardly faced valve cup screw-threaded thereon, a valve retained in the cup and a lower cylindrical part on the stem below the valve cup.

4. In a faucet, an adjustable valve having a stem with a cylindrical upper end having a notch at the head, a screw-threaded portion of less diameter, a lower cylindrical portion of lesser diameter than the screw threads, a valve cup screw-threaded on the threaded portion of the stem, and having lugs on the periphery thereof, and a valve on the stem retained in the cup.

5. A faucet comprising in combination inlet and outlet passages, a valve seat there-between, a plug secured to the top of the valve, a single pieced stem having an upward cylindrical portion, a central screw threaded portion and a lower cylindrical portion, the upper portion being slidably mounted in the plug, the central screw threaded portion extending through the valve seat and having a valve cup screw threaded thereon, a valve in the said cup, means to retain the valve cup from rotation, a cap having a screw threaded engagement with the lower part of the faucet and opposite the plug, a spring in the cap normally tensioned to press the valve against the valve seat, a socket in the cap for the lower cylindrical portion of the stem, means on the stem outside of the plug to rotate the stem to adjust the valve cup and valve and means to reciprocate the stem to open the valve seat.

In testimony whereof I affix my signature.

FRANKLIN D. CHASE.